(12) United States Patent
Baroni et al.

(10) Patent No.: US 8,403,810 B2
(45) Date of Patent: Mar. 26, 2013

(54) METHOD INCLUDING A SYSTEM FOR CONTROLLING THE TORQUE TRANSFERABLE BY A MECHANICAL DRIVE EMPLOYING AN OIL-BATH CLUTCH

(75) Inventors: Massimo Baroni, Castellarano (IT); Francesco Roli, Modena (IT); Eugenio Sereni, San Vito di Spilamberto (IT)

(73) Assignee: CNH America LLC, New Holland, PA (US)

( * ) Notice: Subject to any disclaimer, the term of this patent is extended or adjusted under 35 U.S.C. 154(b) by 367 days.

(21) Appl. No.: 12/709,342

(22) Filed: Feb. 19, 2010

(65) Prior Publication Data
US 2010/0216595 A1   Aug. 26, 2010

(30) Foreign Application Priority Data
Feb. 20, 2009   (IT) .............................. BO2009A0097

(51) Int. Cl.
*F16H 61/662* (2006.01)
(52) U.S. Cl. ........................................................ 477/45
(58) Field of Classification Search .................... 477/44, 477/45, 70; 192/3.63, 3.58, 3.56
See application file for complete search history.

(56) References Cited

U.S. PATENT DOCUMENTS

| | | | |
|---|---|---|---|
| 4,928,822 A * | 5/1990 | Geisser .......................... | 206/716 |
| 6,179,739 B1 | 1/2001 | Tsai | |
| 6,243,638 B1 * | 6/2001 | Abo et al. ........................ | 701/51 |
| 6,394,930 B1 * | 5/2002 | Reuschel ......................... | 477/83 |
| 2007/0184936 A1 * | 8/2007 | Nakayama ....................... | 477/44 |
| 2010/0160111 A1 * | 6/2010 | Yamanaka et al. .............. | 477/45 |
| 2011/0077829 A1 * | 3/2011 | Morselli et al. ................. | 701/61 |

* cited by examiner

*Primary Examiner* — Sherry Estremsky
*Assistant Examiner* — Lillian Nguyen
(74) *Attorney, Agent, or Firm* — Sue C. Watson

(57) ABSTRACT

A system and method for controlling the torque transferable by a mechanical drive between an engine and a shaft of a vehicle includes a first actuator which acts on a variable-speed drive, a second actuator which acts on a clutch to determine the degree of engagement/release of the clutch; and a measuring device for measuring the torque to or from the variable-speed drive. The first and second actuators and the measuring device are controlled by an electronic central control unit to protect the variable-speed drive and/or the clutch from mechanical overloading of the mechanical drive.

14 Claims, 6 Drawing Sheets

US 8,403,810 B2

METHOD INCLUDING A SYSTEM FOR CONTROLLING THE TORQUE TRANSFERABLE BY A MECHANICAL DRIVE EMPLOYING AN OIL-BATH CLUTCH

The present invention relates to a system and method for controlling the torque transferable by a mechanical drive. The present invention may be used to particular advantage, though not exclusively, in small, i.e. low-power, work vehicles (mechanical shovels, excavators, tractors, etc.).

A common problem of work vehicles (mechanical shovels, excavators, tractors, etc.) with low-power engines is that, when moving a heavy load, of gravel for example, persistent acceleration by the driver may result in even serious damage to drive components between the engine and the drive-wheel axle.

It is therefore an object of the present invention to provide a system and method for controlling the torque transferable by a mechanical drive.

An object of the present invention is therefore to provide a system and method for fully safeguarding the mechanical component parts of the mechanical drive.

The present invention employs a clutch assembly whose release/engagement percentage can be determined and controlled electronically, and which advantageously, though not necessarily, comprises an oil-bath clutch.

The mechanical drive considered also comprises a variable-speed drive, which advantageously, though not necessarily, comprises two pulleys connected by a chain.

The clutch assembly may be located up- or downstream from the variable-speed drive.

A further embodiment of the present invention comprises a first clutch assembly upstream from the variable-speed drive, and a second clutch assembly downstream from the variable-speed drive.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
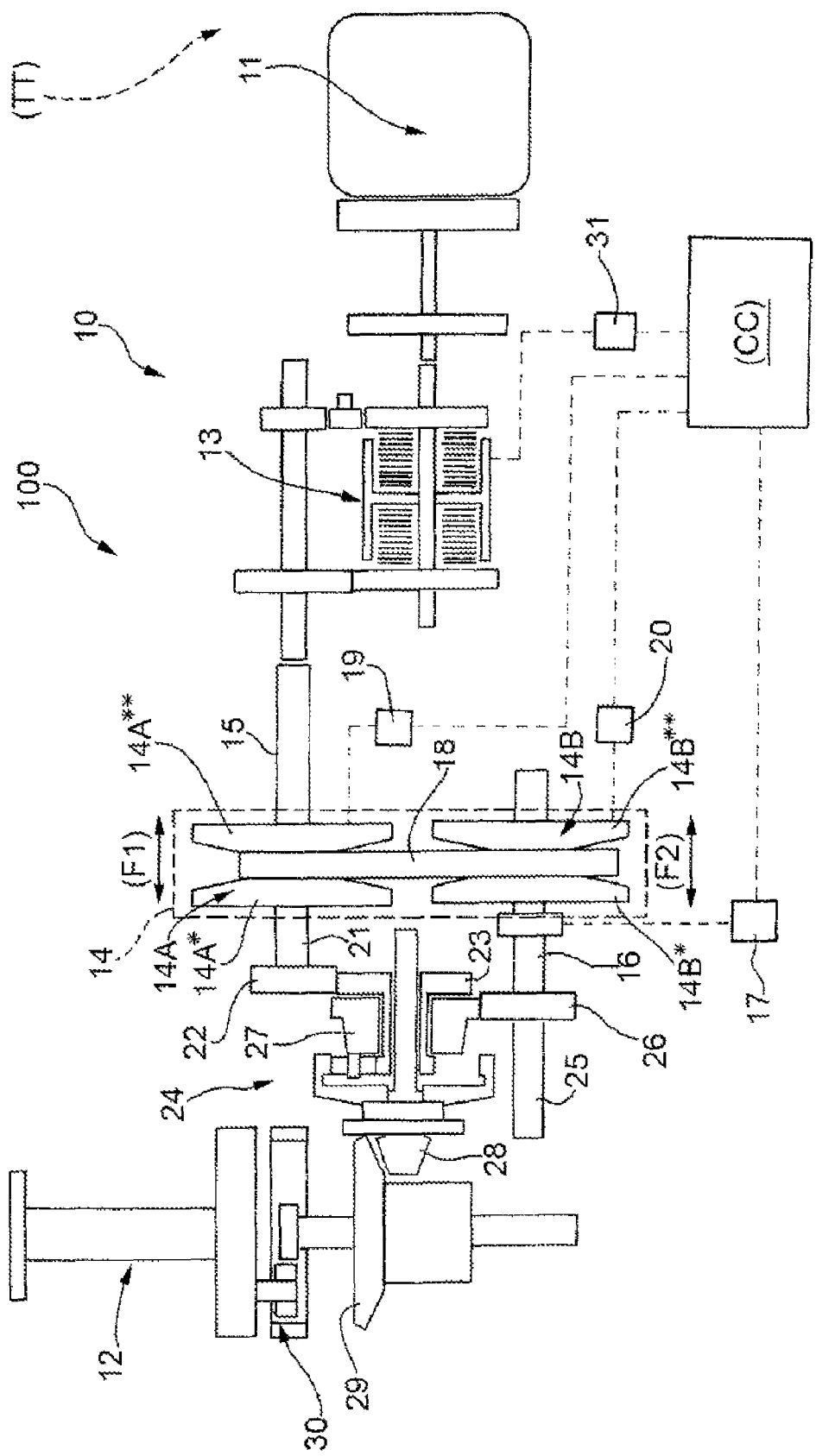
FIG. 1 shows an overall diagram of a mechanical drive forming part of a system which is the main object of the present invention.

FIG. 1 shows a whole a drive 10 between an engine 11 and a rear axle 12 of a vehicle (only shown partly).

Drive 10 comprises in known manner a number of mechanical devices arranged in series.

More specifically, a clutch 13 (advantageously, though not necessarily, an oil-bath clutch) is located downstream from engine 1, and is followed by a variable-speed drive 14 which transmits power from an input shaft 15 to an output shaft 16 (parallel to input shaft 15) fitted with a measuring device 17 for measuring the output torque from variable-speed drive 14.

The variable-speed drive 14 comprises two pulleys 14A, 14B connected mechanically by a chain 18 and each comprising two half-pulleys 14A\*, 14A\*\* and 14B\*, 14B\*\*.

Half-pulleys 14A\*, 14A\*\* are coaxial with input shaft 15, and half-pulleys 14B\*, 14B\*\* are coaxial with output shaft 16.

Half-pulleys 14A\*, 14A\*\* and 14B\*, 14B\*\* are movable in respective two-way directions (F1) and (F2). To do so, each pulley 14A, 14B has a hydraulic actuator 19, 20, which pushes the two half-pulleys 14A\*, 14A\*\*, 14B\*, 14B\*\* against each other to adjust the velocity ratio of shafts 15 and 16 in known manner.

Half-pulley 14A\* is fitted to a shaft 21 fitted with a gear 22 that meshes with a sun gear 23 of an epicyclic gear train 24. Similarly, half-pulley 14B\* is fitted to a shaft 25 fitted with a gear 26 that meshes with a planet carrier 27 forming part of epicyclic gear train 24.

The two motions of gears 22 and 26 combine in known manner in epicyclic gear train 24 to rotate a pinion 28 that meshes with a bevel gear 29 that transmits motion to a differential 30 and therefore to rear axle 12 fitted with the rear wheels (not shown) of the vehicle.

Clutch 13 is operated in known manner by an actuator 31 that determines the (percentage) degree of engagement of clutch 13 (see below); and the way in which clutch 13 is engaged in turn determines the travelling direction (forward/reverse) of the vehicle.

Actuators 19, 20 of variable-speed drive 14, actuator 31 of clutch 13, and measuring device 17 for measuring the output torque of variable-speed drive 14 are connected functionally to an electronic central control unit (CC) which, as will be seen, forms part of a control system 100 implementing a control method for controlling the torque transferable by drive 10. As described in detail below, electronic central control unit (CC) therefore imparts commands to the control devices of actuators 19, 20, 31 to set drive 10 according to user requirements and the intrinsic capacity of drive 10.

An alternative embodiment has only one actuator, which controls the variable-speed drive and moves the two pulleys 14A, 14B inversely (i.e. as one tightens, the other slackens).

Figure 2:
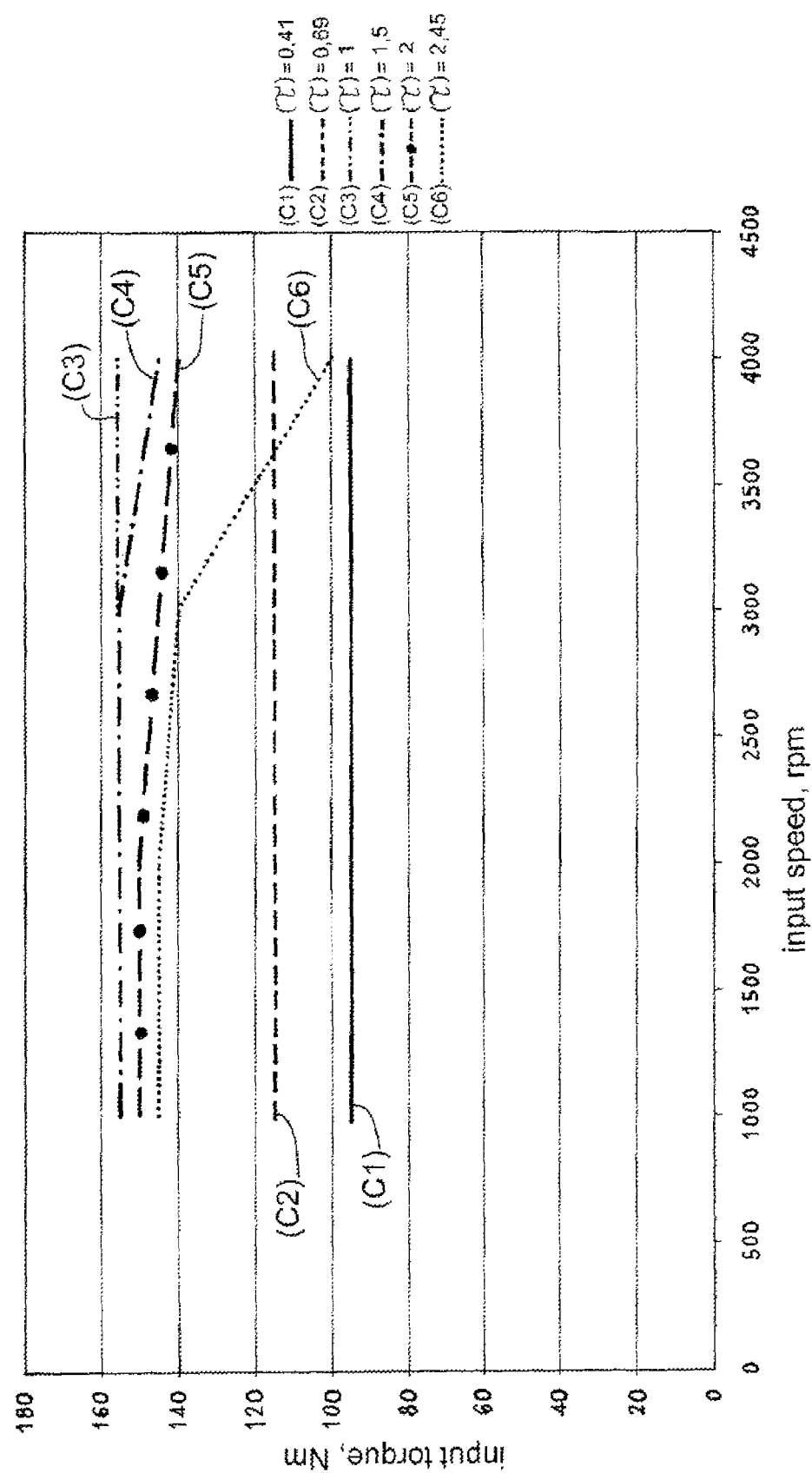
FIG. 2 shows a graph of the input speed to a variable-speed drive along the x axis, and the maximum torque from the variable-speed drive, parameterized according to the velocity ratios of the variable-speed drive, along the y axis.

In the FIG. 2 graph, the y axis shows the input speed of variable-speed drive 14 measured on input shaft 15, and the x axis the maximum torques from pulley 14A of variable-speed drive 14.

The FIG. 2 graph also shows a number of curves (C1), (C2), (C3), (C4), (C5), (C6) parameterized with respect to the velocity ratio τ=(N2/N1), where N1 is the number of revolutions of pulley 14A, and N2 the number of revolutions of pulley 14B.

Velocity ratio (τ) may of course be adjusted by appropriately operating actuators 19 and 20 controlled by electronic central control unit (CC).

Curves (C1), (C2), (C3), (C4), (C5), (C6) are interpreted, for example, as follows:

assuming a speed of 2000 rpm of shaft 15 and a velocity ratio (τ)=0.41 (curve (C1)), this means the useful diameter of pulley 14A is small with respect to that of pulley 14B, which means that, in the example considered, no more than 90 Nm (obviously minus a safety factor) can pass through pulley 14A; otherwise, pulley 14A may be even irreparably damaged;

assuming the same speed of 2000 rpm of shaft 15, but a velocity ratio (τ) of variable-speed drive 14 of 0.69, for example, (curve (C2)), the torque that can pass through pulley 14A increases to roughly 115 Nm, which is as to be expected, since increasing velocity ratio (τ) also increases the useful diameter of pulley 14A.

The system may be said to directly measure a pressure (Pf) as opposed to torque. Pressure (Pf) is then converted to a torque on the basis of a physical law provided by the supplier; at which point, the resulting torque may be transferred upstream or downstream of variable-speed drive 14 using velocity ratio (τ).

Figure 3:
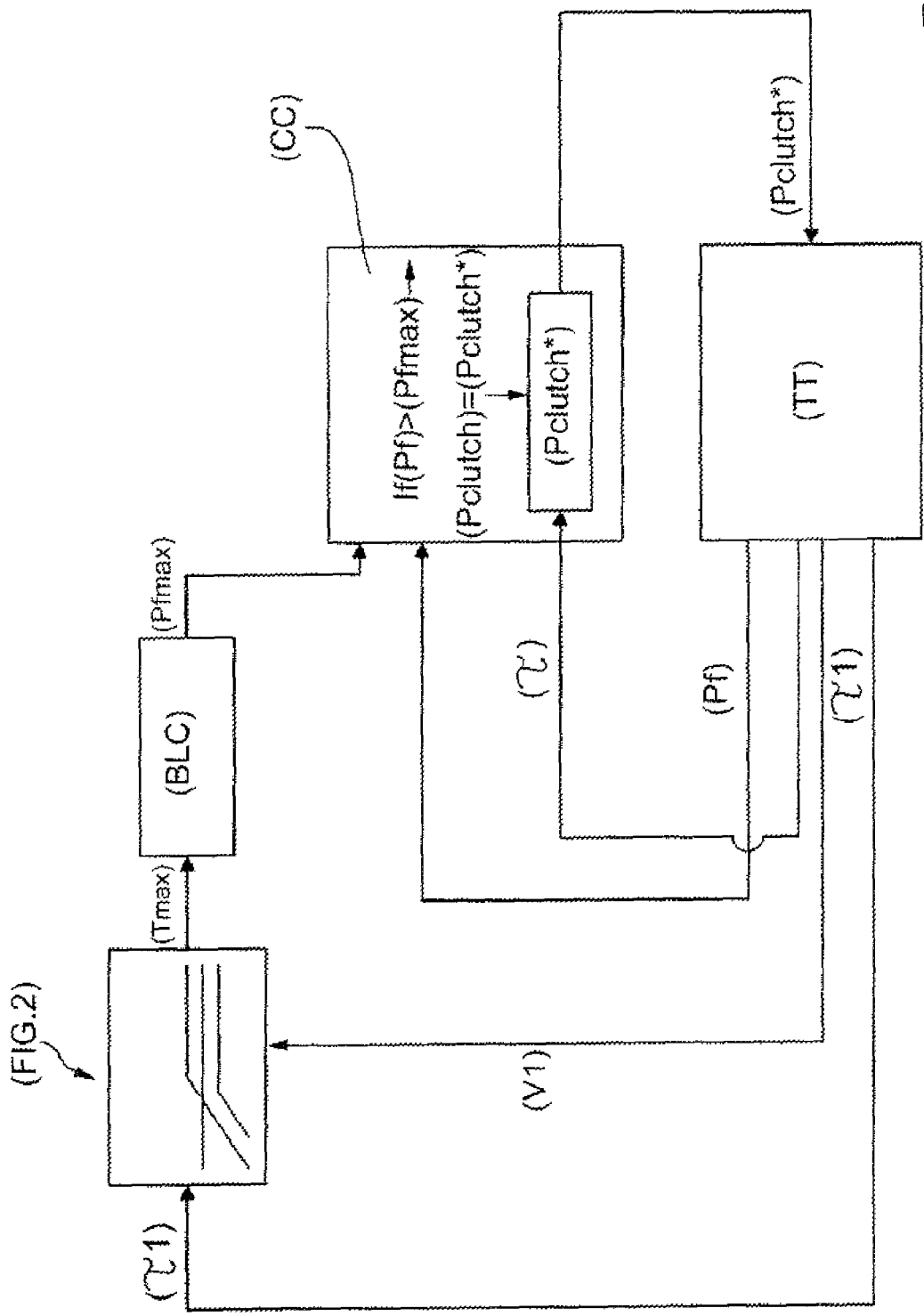
FIG. 3 shows a schematic of the basic principles of the control method, which is a further object of the present invention.

FIG. 3 shows the basic principles of the control method according to the present invention. A start value (τ1) of the velocity ratio between the pulleys of variable-speed drive 14, and a start value (v1) of the speed of input shaft 15 are recorded on a tractor (TT). Using a graph of the type shown in FIG. 2, and entering values (τ1) and (v1), a maximum permissible torque value (Tmax) for variable-speed drive 14 in those work conditions is obtained. In a block (BLC), the maximum permissible torque value (Tmax) is converted to a maximum permissible pressure value (Pfmax). Electronic central control unit (CC) then compares the pressure value (Pf) recorded on tractor (TT) with the maximum permissible pressure value (Pfmax). If (Pf) is greater than (Pfmax), the work pressure (Pclutch) of clutch 13 is set to a theoretical value (Pclutch*) which theoretically produces a pressure (Pf) of variable-speed drive 14 lower than or at most equal to (Pfmax). Accordingly, clutch 13 is partly released (and set to pressure value (Pclutch*)) and begins slipping, thus transmitting less torque to variable-speed drive 14.

Figure 4:
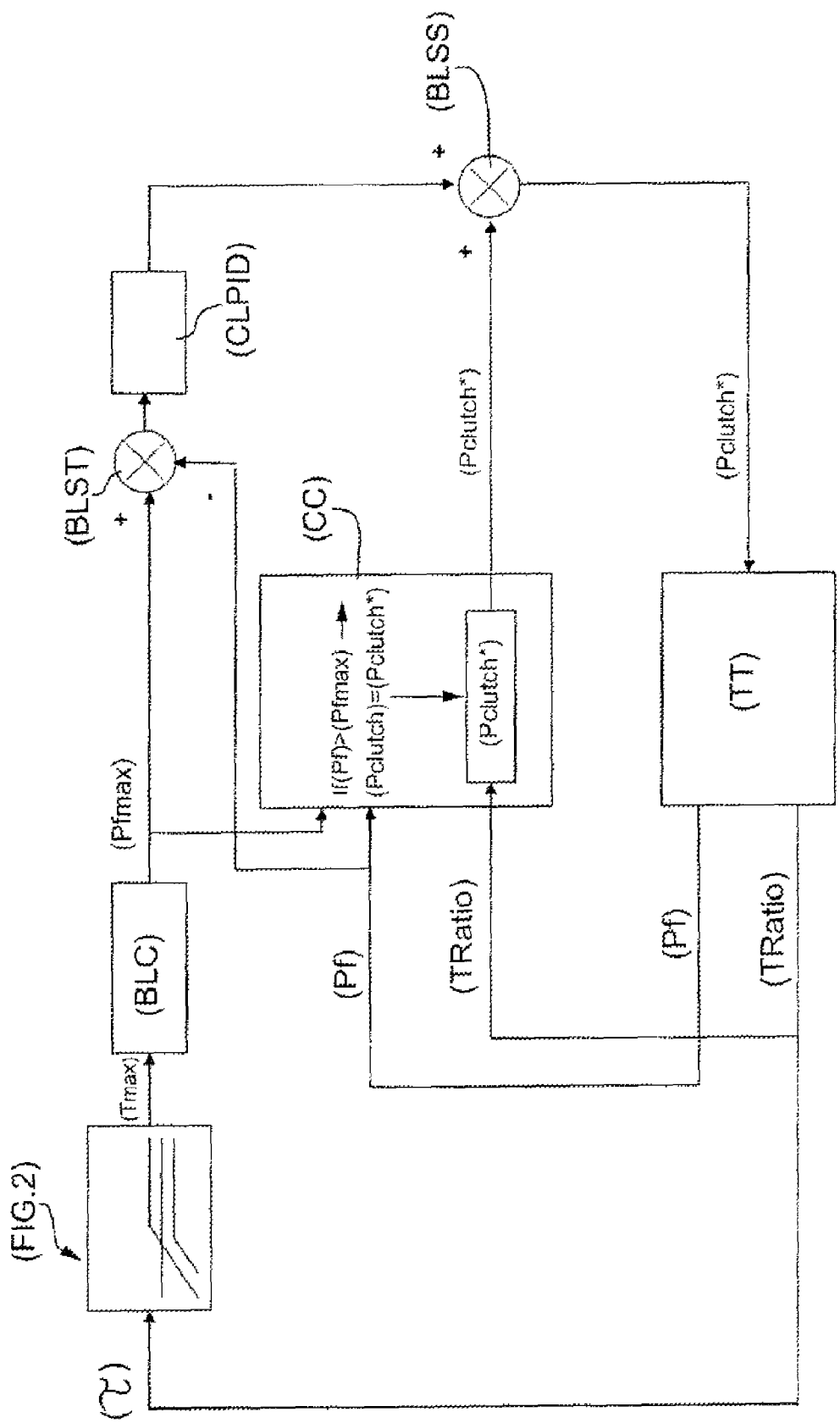
FIG. 4 shows a control diagram similar to that in FIG. 3, but with additional operating blocks.

In FIG. 4, a subtraction block (BLST) is added to the FIG. 3 control diagram, and is followed by a PID (proportional-integral-derivative) controller (CLPID). The feedback signal reprocessed by controller (CLPID) is sent to an adding block (BLSS), where it is added to theoretical value (Pclutch*) and sent to clutch 13 of tractor (TT). This feedback serves to compensate for any errors in calculating theoretical value (Pclutch*). If the control logic were to maintain a (Pclutch) value giving a variable-speed-drive 14 pressure of (Pfmax), the user would be unaware of the condition, and clutch 13 would be damaged. So, to solve the problem, the control logic, as opposed to limiting variable-speed-drive 14 pressure (Pfmax), controls (Pf) using clutch 13 as an actuator.

Figure 5:
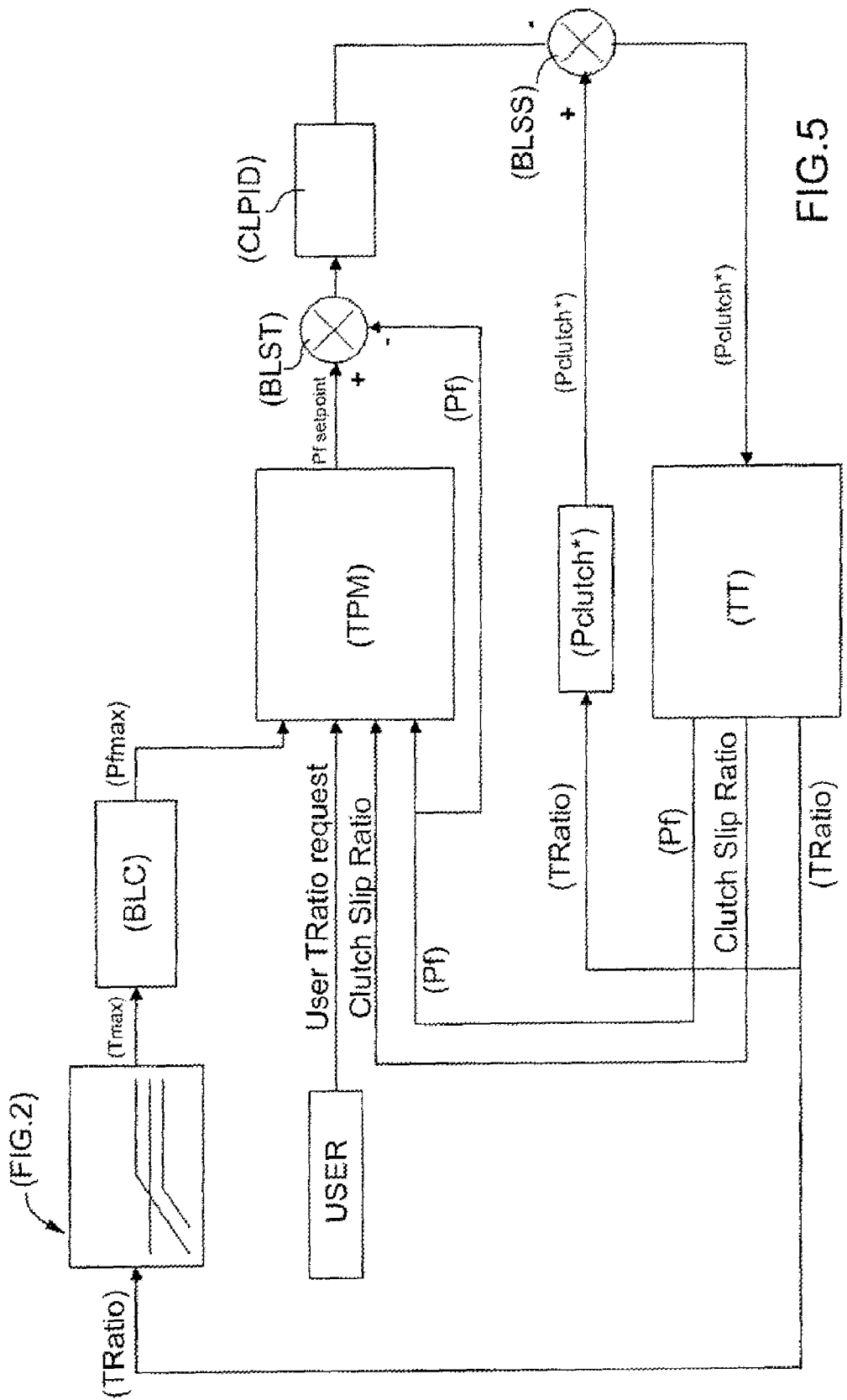
FIG. 5 shows a control diagram similar to that in FIG. 4, but with an additional block representing control logic that takes into account certain operating parameters.

All this is shown in FIG. 5, which has an additional block (TPM) (Torque Pressure Management) which represents a control logic that controls the setpoint of (Pf) taking into account the user request, the measured slip ratio, and the measured (Pf) value.

In the example shown, (Pfsetpoint) is controlled to give the user the impression the system is limiting. This is done by gradually reducing (Pfsetpoint) (thus reducing the slip ratio) if user request exceeds the capacity of the system. After a given time, if the load is still too high, clutch 13 is released, and the user is requested to reset the operation (i.e. to release the accelerator pedal).

Figure 6:
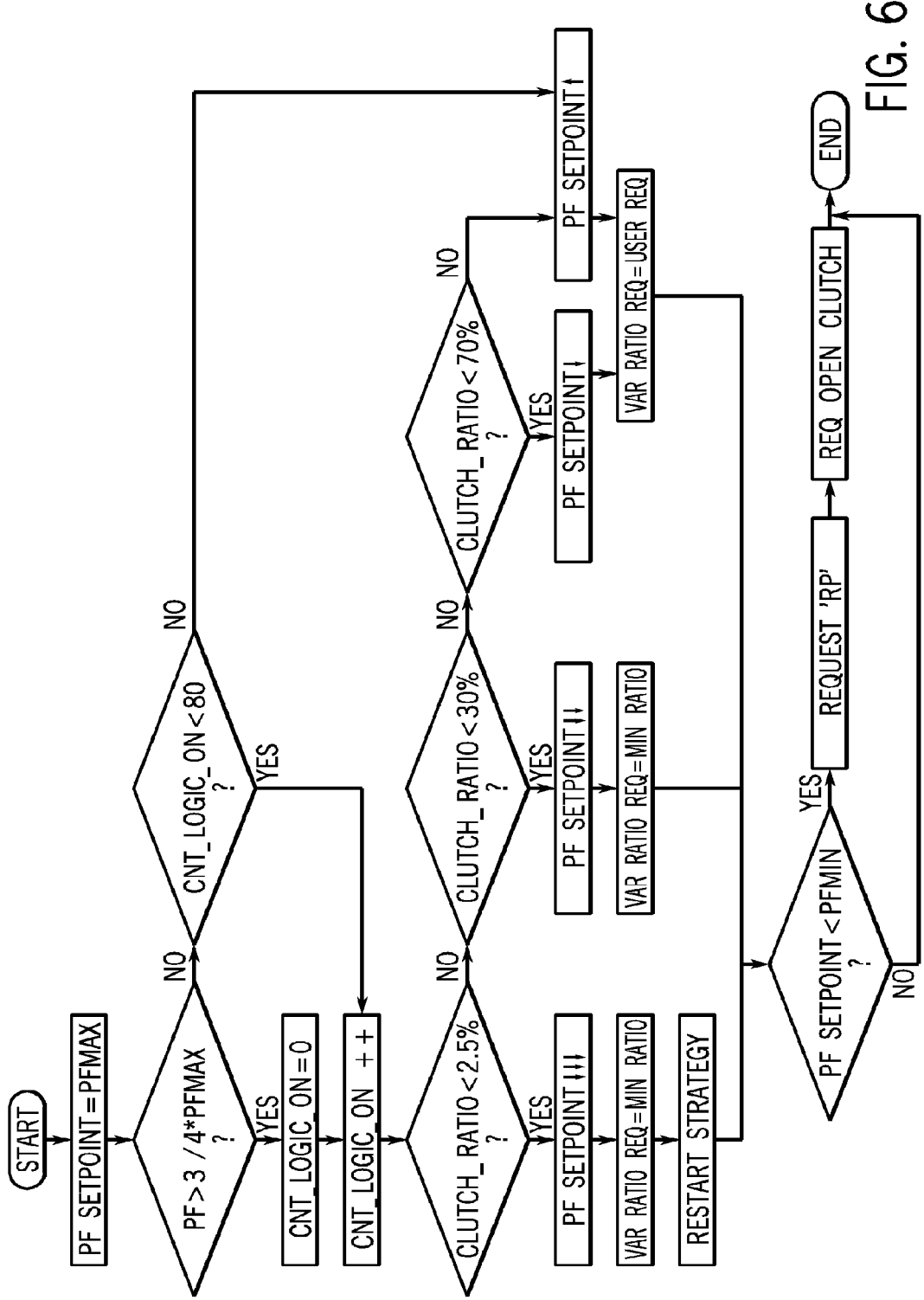
FIG. 6 shows a block diagram of the control method of the system.

FIG. 6 shows a flow chart of the logic operations performed by the control system to achieve the above. The system is initialized by making (Pfsetpoint) equal to (Pfmax), which means that, when initialized, the system always has maximum pull capacity. The first thing checked in the control loop is the measured value of (Pf), i.e. the torque to variable-speed drive 14. If (Pf) is over 75% of permissible torque (Pfmax), the system proceeds to check slip of clutch 13.

If the previous condition is met, the current engagement ratio of clutch 13 is checked. If the current engagement ratio of clutch 13 is over 70%, (Pfsetpoint) is made equal to the maximum value (or increased if it was previously reduced) to regain full pull capacity of the system. The velocity ratio (τ) of variable-speed drive 14 is that requested by the user.

If the current engagement ratio of clutch 13 ranges between 30% and 70%, (Pfsetpoint) is reduced by a low reduction factor to make less pull capacity available to the user. The requested velocity ratio (τ) of variable-speed drive 14 is that requested by the user.

If the engagement ratio ranges between 2.5% and 30%, (Pfsetpoint) is reduced by an intermediate reduction factor to make even less pull capacity available to the user. The requested velocity ratio (τ) is the minimum ratio, thus bypassing user request.

If the engagement ratio is less than 2.5%, (Pfsetpoint) is reduced by a high reduction factor to make even less torque available to the user. The requested velocity ratio (τ) of variable-speed drive 14 is the minimum ratio, thus bypassing user request.

If (Pfsetpoint) becomes less than (Pfmin), the clutch is released by the control logic to prevent it from overheating, and a control panel issues an Rp (Release Pedal) user message, i.e. the system tells the user to release the control pedal and possibly start another sequence.

Conversely, if the measured (Pf) value is less than 75% of (Pfmax), then (Pfsetpoint), if not already the maximum permissible, is increased by a given factor until it reaches the maximum value (this occurs, for example, when, after a period in which the slip control is active, the load ceases, thus returning the resisting torque, and therefore (Pf), to below 75% of the permissible value.

If the slip control is active (measured (Pf) value over 75% of the permissible value), it is only deactivated if (Pf) is found to have fallen below 75% of the permissible value for more than 800 ms.

As shown in the FIG. 6 flow chart, if the clutch engagement ratio is less than 30%, the control logic bypasses the user velocity ratio request and assigns a minimum velocity ratio target. This assignment derives from a design constraint in the system. That is, variable-speed drive 14 can only be moved if there is movement at the two pulleys 14A and 14B, i.e. only as clutch 13 is engaged.

Obviously, if clutch 13 is released (thus cutting off motion to variable-speed drive 14) when variable-speed drive 14 is not at minimum velocity ratio (τ), it follows that, at the next startup, clutch 13 will be reengaged with variable-speed drive 14 at a high velocity ratio (τ), thus possibly resulting in stalling of engine 11 (FIG. 1).

To prevent this, as the torque control releases clutch (engagement ratio of less than 30%), the system sets variable-speed drive 14 to the minimum velocity ratio (τ), to ensure the most favourable start condition of variable-speed drive 14 at the next startup.

An advantage of the system and method described lies in perfectly controlling the torque transferable by a mechanical drive, and in fully safeguarding the component parts of the mechanical drive itself.

What is claimed is:

1. A method including a system for controlling the torque transferable by a mechanical drive between an engine and a shaft of a vehicle, said mechanical drive having a clutch and a variable-speed drive for transmitting motion between an input shaft and an output shaft, the method comprising:
   providing a first actuator that acts on at least one member of said variable-speed drive;
   providing a second actuator that acts on at least a clutch, said second actuator determining a degree of engagement/release of said clutch;

providing a measuring device configured for measuring torque to or from said variable-speed drive;

providing an electronic central controller, said controller controlling said first and second actuators and said measuring device to protect said variable-speed drive and said clutch from mechanical overloading of the mechanical drive;

recording torque transmission on a variable-speed drive, including recording an initial value of a velocity ratio between pulleys of the variable-speed drive, and an initial value of a speed of an input shaft of the variable-speed drive; from the initial value of the velocity ratio and the initial value of speed of the input shaft values, a maximum permissible torque value is obtained for the variable-speed drive in those work conditions;

converting the maximum permissible torque value to a maximum permissible pressure value; and setting a degree of release and engagement of the clutch as a function of said torque transmission recorded on the variable-speed drive, wherein the controller compares a measured pressure value, and the maximum permissible pressure value and if the measured pressure value is greater than the maximum permissible pressure value, work pressure of the clutch is set to a theoretical value, which theoretically produces a pressure on the variable-speed drive lower than or at most equal to the maximum permissible pressure value; the clutch is therefore partly released and set to the theoretical pressure value and begins slipping and transmitting less torque to the variable-speed drive.

2. The method of claim 1, wherein an operation is performed by a subtraction block and followed by an operation performed by a PID, proportional-integral-derivative, controller.

3. The method of claim 2, wherein a feedback signal reprocessed by the controller is sent to an adding block, where it is added to the theoretical value of the work pressure of the clutch and sent to the clutch.

4. The method of claim 2, wherein control logic, as opposed to limiting variable-speed-drive maximum permissible pressure value, controls pressure using the clutch as an actuator.

5. The method of claim 4, wherein a further operation performed in a torque pressure management block, the torque pressure management block configured to derive a pressure set point value from a user request value, a measured slip ratio, and the measured pressure value.

6. The method of claim 5, wherein the pressure set point value is controlled to give a user an impression that the system is limiting by gradually reducing pressure set point value if the user request exceeds a capacity of the system; and, after a given time, if a load is still too high, the clutch is released, and the user is requested to reset operation.

7. The method of claim 1, wherein
the system is initialized by making a pressure set point value equal to maximum permissible pressure value;
if the measured pressure value is over 75% of permissible torque, the system proceeds to check slip of the clutch;
if a previous condition is met, a current engagement ratio of the clutch is checked;
if the current engagement ratio of the clutch is over 70%, a pressure set point value is made equal to the maximum value or increased if it was previously reduced to regain full pull capacity of the system; in which case, the velocity ratio of the variable-speed drive is that requested by a user.

8. The method of claim 1, wherein if a current engagement ratio of the clutch ranges between 30% and 70%, a pressure set point value is reduced by a low reduction factor to make less pull capacity available to a user; and requested velocity ratio of the variable-speed drive is that requested by the user.

9. The method of claim 1, wherein if an engagement ratio ranges between 2.5% and 30%, a pressure set point value is reduced by an intermediate reduction factor to make even less pull capacity available to a user; and requested velocity ratio is a minimum ratio, thus bypassing user request.

10. The method of claim 1, wherein if an engagement ratio is less than 2.5%, pressure set point value is reduced by a high reduction factor to make even less torque available to a user; and a requested velocity ratio of the variable-speed drive is a minimum ratio, thus bypassing user request.

11. The method of claim 7, wherein if the pressure set point value becomes less than a minimum permissible pressure value, the clutch is released by a control logic of the controller to prevent the clutch, and a control panel issues a Release Pedal user message displaying to the user to release the control pedal and possibly start another sequence.

12. The method of claim 1, wherein slip control is active if the measured pressure value is over 75% of the maximum permissible pressure value, the slip control is deactivated if the measured pressure value is found to be fallen below 75% of the maximum permissible pressure value for a given time lapse.

13. The method of claim 12, wherein if a clutch engagement ratio is less than 30%, control logic bypasses a user velocity ratio request and assigns a minimum velocity ratio target.

14. The method of claim 1, wherein as torque control releases the clutch with an engagement ratio below a given value, the variable-speed drive is set to a minimum velocity ratio, to ensure favorable start conditions of the variable-speed drive at a next startup.

* * * * *